US008196431B2

(12) United States Patent
Burdette et al.

(10) Patent No.: US 8,196,431 B2
(45) Date of Patent: Jun. 12, 2012

(54) METHODS FOR CONTROLLING GLASS SHEET THICKNESS

(75) Inventors: Steven Roy Burdette, Big Flats, NY (US); Vladislav Y Golyatin, Lexington, KY (US); Gautam Meda, Corning, NY (US); Randy Lee Rhoads, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 351 days.

(21) Appl. No.: 12/469,244

(22) Filed: May 20, 2009

(65) Prior Publication Data

US 2010/0293998 A1 Nov. 25, 2010

(51) Int. Cl.
*C03B 18/02* (2006.01)
*C03B 18/04* (2006.01)

(52) U.S. Cl. ............... 65/29.14; 65/29.12; 65/90; 65/91; 65/92; 65/93

(58) Field of Classification Search ............... 65/90–101, 65/29.12, 29.14
See application file for complete search history.

(56) References Cited

U.S. PATENT DOCUMENTS

| | | | |
|---|---|---|---|
| 3,682,609 A | 8/1972 | Dockerty | 65/83 |
| 2007/0140311 A1* | 6/2007 | House et al. | 374/100 |

OTHER PUBLICATIONS

Arkun, Y; Kayihan, F. 1998. A novel approach to full CD profile control of sheet-forming processes using adaptive PCA and reduced-order IMC design. *Computers & Chemical Engineering* 22 (7-8): 945-962.

Braatz, RD; Tyler, ML; Morari, M; Pranckh, FR; Sartor, L. 1992. Identification and Cross-Directional Control of Coating Processes. *AICHE Journal* 38 (9): 1329-1339.

Chang, DM; Chien, IL; Yu, CC. 2000. Control structure design for sheet forming processes. *Journal of the Chinese Institute of Chemical Engineers* 31 (4): 375-392.

Chang, DM; Yu, CC; Chien, IL. 2000. Design sensor trajectory for control: Application to sheet-forming processes. *AICHE Journal* 46 (8): 1581-1592.

Chang, DM; Yu, CC; Chien, IL. 2001. Arrangement of multi-sensor for spatio-temporal systems: application to sheet-forming processes. *Chemical Engineering Science* 56 (20): 5709-5717.

Corscadden, KW; Duncan, SR. 1997. Reduced-order estimator for closed-loop online estimation of cross-directional parameters in a plastics extrusion process. *IEE Proceedings—Control Theory and Applications* 144 (6): 549-557.

Duncan, SR; Allwood, JM; Garimella, SS. 1998. The analysis and design of spatial control systems in strip metal rolling. *IEEE Transactions on Control Systems Technology* 6 (2): 220-232.

Duncan, SR. 1997. Estimating the response of actuators in a cross-directional control system. *Pulp & Paper—Canada* 98 (4): 61-64.

Featherstone, AP; Braatz, RD. 1997. Control-oriented modeling of sheet and film processes. *AICHE Journal* 43 (8): 1989-2001.

(Continued)

*Primary Examiner* — Matthew Daniels
*Assistant Examiner* — Jodi C Franklin
(74) *Attorney, Agent, or Firm* — Siwen Chen; Maurice M. Klee

(57) ABSTRACT

Methods for controlling thickness variations across the width of a glass ribbon (104) are provided. The methods employ a set of thermal elements (106) for locally controlling the temperature of the ribbon (104). The operating values for the thermal elements (106) are selected using an iterative procedure in which thickness variations measured during a given iteration are employed in a mathematical procedure which selects the operating values for the next iteration. In practice, the method can bring thickness variations of glass sheets within commercial specifications in just a few iterations, e.g., 2-4 iterations.

16 Claims, 4 Drawing Sheets

OTHER PUBLICATIONS

Heath, WP; Wills, AG. 2004. Design of cross-directional controllers with optimal steady state performance. *European Journal of Control* 10 (1): 15-27.

Ismail, A; Dumont, GA; Backstrom, J. 2003. Dual adaptive control of paper coating. *IEEE Transactions on Control Systems Technology* 11 (3): 289-309.

Kjaer, AP; Heath, WP; Wellstead, PE. 1995. Identification of Cross-Directional Behaviour in Web Production—Techniques and Experience. *Control Engineering Practice* 3 (1): 21-29.

Liang, Y; Kurihara, K; Saito, K; Murakami, H; Kumagai, K; Ohshima, M; Tanigaki, M. 1998. Profile control of plastic sheet in an industrial polymer processing process. *Polymer Engineering and Science* 38 (10): 1740-1750.

Rawlings, JB; Chien, IL. 1996. Gage control of film and sheet-forming processes. *AICHE Journal* 42 (3): 753-766.

Rigopoulos, A; Arkun, Y. 2003. Reduced order cross-directional controller design for sheet forming processes. *IEEE Transactions on Control Systems Technology* 11 (5): 746-756.

Saffer, DR; Doyle, FJ. 2002. Closed-loop identification with MPC for an industrial scale CD-control problem. *IEE Proceedings—Control Theory and Applications* 149 (5): 448-456.

Tyler, ML; Morari, M. 1995. Estimation of Cross-Directional Properties—Scanning vs Stationary Sensors. *AICHE Journal* 41 (4): 846-854.

Van Antwerp, JG; Braatz, RD. 2000. Model predictive control of large scale processes. *Journal of Process Control* 10 (1): 1-8.

VanAntwerp, JG; Braatz, RD. 2000. Fast model predictive control of sheet and film processes. *IEEE Transactions on Control Systems Technology* 8 (3): 408-417.

VanAntwerp, JG; Braatz, RD. 2004. Discussion on: "Design of cross-directional controllers with optimal steady state performance". *European Journal of Control* 10 (1): 28-29.

VanAntwerp, JG; Featherstone, AP; Braatz, RD. 2001. Robust cross-directional control of large scale sheet and film processes. *Journal of Process Control* 11 (2): 149-177, Sp. Iss. SI.

VanAntwerp et al., "Cross-directional control of sheet and film processes," *Automatica*, 2007, 43:191-211.

Wellstead, PE; Zarrop, MB; Duncan, SR. 2000. Signal processing and control paradigms for industrial web and sheet manufacturing. *International Journal of Adaptive Control and Signal Processing* 14 (1): 51-76.

\* cited by examiner

METHODS FOR CONTROLLING GLASS SHEET THICKNESS

FIELD

This disclosure relates to the manufacture of glass sheets and, in particular, to methods for controlling variations in the thickness of glass ribbons from which glass sheets are produced.

BACKGROUND

U.S. Pat. No. 3,682,609 to Stuart M. Dockerty (the Dockerty patent) describes a system for controlling the thickness distribution across the width of a glass ribbon by locally controlling its temperature. To do so, the Dockerty patent uses a pair of refractory plates or walls whose long axes run parallel to the width of the ribbon. One plate is located on each side of the ribbon and the pair are positioned along the length of the ribbon above the point where the thickness of the ribbon becomes fixed. The plates are placed relatively close to the ribbon so that they can absorb heat from the molten glass.

An array of tubes is located behind each plate and oriented so that fluid (e.g., air) ejected from the tubes impinges on the back of the plate. The fluid flow from each tube is individually controllable. By adjusting the fluid flow from the tubes, the local temperature on the front face of the plate can be controlled. This local temperature affects the local heat loss, and thus the local temperature, of the molten glass, which, in turn, affects the final thickness distribution across the width of the ribbon. In practice, the Dockerty system has proven highly effective in controlling thickness variations across the width of glass ribbons and is widely used in the production of glass sheets for such demanding applications as substrates for liquid crystal and organic light emitting diode displays (LCDs and OLEDs).

As currently practiced, the air flow rates in the tubes of the Dockerty system are adjusted manually by operators. Operators look at a measured sheet thickness trace and use their experience and judgment, or "feel," to decide which tubes to adjust, and by how much, to eliminate non-uniformities in the thickness trace. This reliance on "feel" causes a variety of problems.

For example, when there is a significant change to the process, such as a higher glass flow rate or a different glass composition, substantial time is often needed during start-up until operators acquire a "feel" for the way the changed process behaves. Furthermore, as thickness variation specifications are tightened, there is no way of knowing whether operator "feel" will be able to meet the new specifications and, if so, how long it will take to do so. Although operator "feel" has worked in the past, it is unclear if it will be up to the challenges imposed by ever more exacting standards for glass sheets, especially those used as substrates for display applications.

More generally, relying on operator "feel" means that new operators must undergo a learning process before they can make sound judgments regarding air flow distributions across the width of the ribbon. With the expanding demand for flat screen televisions and monitors, there may come a time when trained operators becomes a scarce resource limiting the number of glass making machines that can be in operation at any one time.

The present disclosure addresses these problems and provides methods for controlling the temperature distribution across the width of a glass ribbon so that sheet thickness variations are within specifications without the need for trained operators who have a "feel" for the system. Rather, it has been found that an iterative process which does not rely on "feel" can be employed to meet thickness specifications using a small number of iterations provided that each iteration is based on a mathematical analysis (described below) of the thickness behavior produced by the prior iteration.

SUMMARY

A method for producing glass sheets is disclosed which includes:
(I) producing a glass ribbon (104) having a width;
(II) using a plurality of thermal elements (106) to control the temperature of the ribbon (104) across its width at a location along the length of the ribbon (104) that is prior to the location where the thickness of the ribbon (104) becomes fixed, the thermal elements (106) being distributed across the width of the ribbon (104) and each element (106) being associated with an independently adjustable operating variable $D_i$; and
(III) separating glass sheets from the ribbon (104);
wherein step (II) comprises selecting a set of values for the operating variables $D_i$ of the thermal elements (106) by:
(a) assigning a sheet thickness response function $\Delta t_i(x)$ to each of the thermal elements (106) of the form:

$$\Delta t_i(x) = \text{func}(x, x0_i, w_i, \ldots),$$

where x is a location on the sheet, $x0_i$ is a location-of-the-thermal-element parameter, $w_i$ is a width-of-effect parameter, and func is a function of at least the variable x and the parameters $x0_i$ and $w_i$;
(b) selecting values for the $x0_i$ and $w_i$ parameters;
(c) selecting a set of $D_i$ values for the thermal elements (106), the set of $D_i$ values being associated with a set of amplitude values $A_i$;
(d) applying the set of $D_i$ values to the thermal elements (106) and producing at least one glass sheet;
(e) measuring a thickness distribution of at least one glass sheet produced in step (d);
(f) determining a revised set of $A_i$ values by minimizing a functional of (i) the measured thickness distribution or a derivative thereof, (ii) the set of $A_i$ values, and (iii) optionally, a target thickness distribution, the functional including a linear superposition of the sheet thickness response functions for the thermal elements (106);
(g) applying a set of $D_i$ values associated with the set of $A_i$ values determined in step (f) to the thermal elements (106) and producing at least one glass sheet;
(h) measuring a thickness distribution of the at least one glass sheet produced in step (g); and
(i) comparing the thickness distribution measured in step (h) with a thickness variation criterion and, if necessary, repeating steps (f) through (h), one or more times, until the criterion is satisfied, where for each repetition, the measured thickness distribution and the set of $A_i$ values used in the functional which is minimized in step (f) are those determined in the prior repetition.

The reference numbers used in the above summary are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is

DETAILED DESCRIPTION OF THE PREFERRED EMBODIMENT

The following discussion is in terms of a fusion downdraw process (also known as a fusion process, an overflow downdraw process, or an overflow process), it being understood that the methods disclosed and claimed herein are also applicable to other downdraw processes such as a slot draw process, as well as to processes that operate horizontally, such as the float process. In the case of the float process (and some fusion processes), the thermal elements will be located on only one side of the glass ribbon, i.e., in the case of a float process, the upper side of the ribbon. As fusion apparatus is known in the art, details are omitted so as to not obscure the description of the example embodiments.

Figure 7:
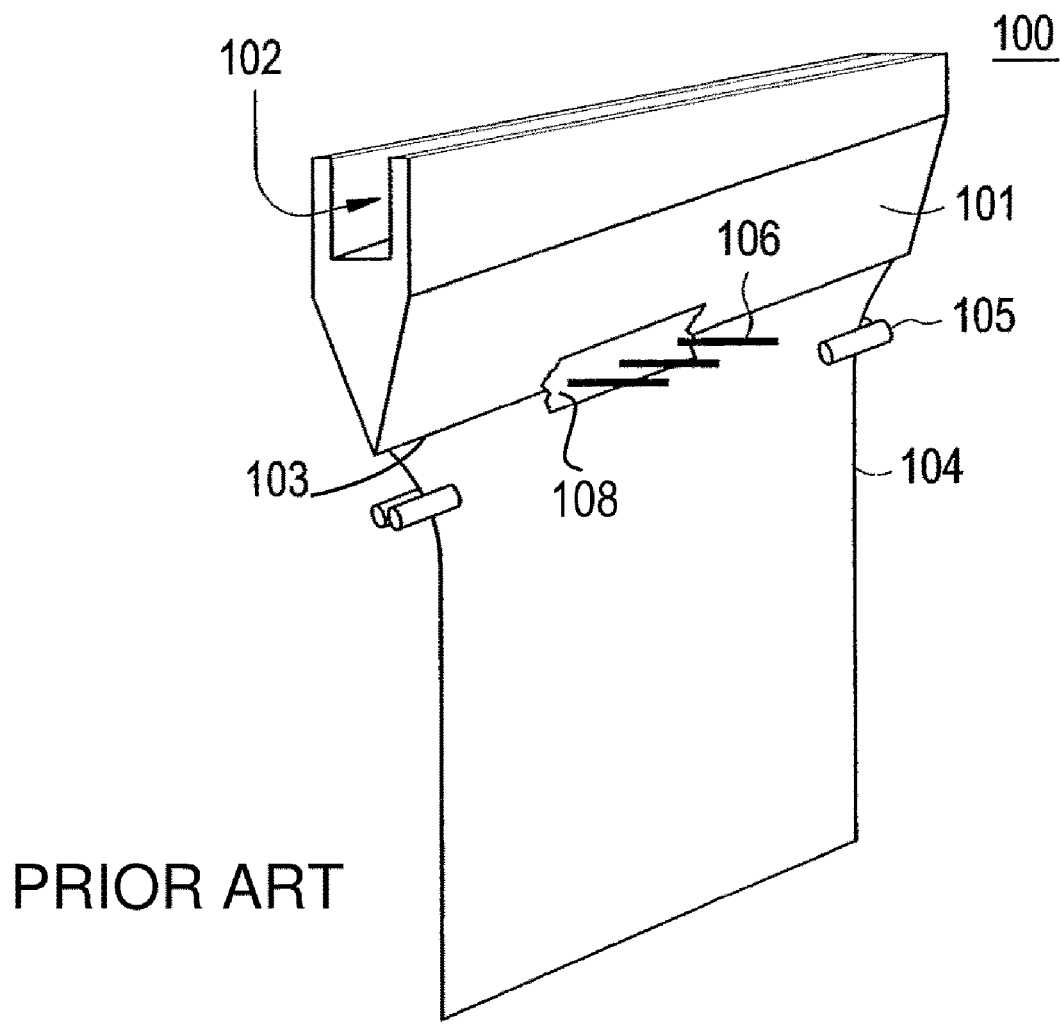
FIG. 7 is a schematic diagram of a fusion downdraw system employing a Dockerty thickness control system.

As shown in FIG. 7, a typical fusion system 100 employs a forming structure (isopipe) 101, which includes a cavity 102 which receives molten glass. The isopipe includes a root 103 where molten glass from the isopipe's two converging sides join together to form ribbon 104. After leaving the root, the ribbon traverses edge rollers 105 and then one or more sets of pulling rollers (not shown), with the edge rollers being used to control the width of the ribbon and the pulling rolls being used to apply tension to the ribbon causing it to move downward at a prescribed rate.

Also shown in FIG. 7 is a portion of a Dockerty thickness control system. The system is located adjacent the isopipe's root and affects the temperature of the molten glass on the surface of the isopipe as well as the temperature at the uppermost end of the ribbon. (As used herein and in the claims, the phrase "a location along the length of the ribbon that is prior to the location where the thickness of the ribbon becomes fixed" includes a location on the forming structure which produces the ribbon, whether that location is used alone or in combination with a location downstream of the forming structure.) As discussed above, the Dockerty system includes a refractory plate 108 and a series of tubes 106 which serve to control the local temperature of the plate and thus the local temperature of the glass ribbon.

Although the Dockerty plate and tube system produces excellent thickness control, other thermal control systems can be used in the practice of the present disclosure if desired. For example, a series of cooling elements that are individually controllable can be aligned across the width of the ribbon. As a further alternative, heating elements can be used either alone or in combination with cooling elements. As used herein and in the claims, the phrase "thermal elements" is intended to include such alternate systems, as well as the original Dockerty system and variations thereof. The following discussion assumes that adjustable air flows from Dockerty tubes are used as the controllable thermal elements, it being understood that references to this specific type of thermal element are only for ease of presentation and are not intended to limit the scope of the disclosure or the claims in any manner. The contents of the Dockerty patent (i.e., U.S. Pat. No. 3,682,609) is incorporated herein by reference in its entirety.

As understood by skilled persons, there is a one-to-one correspondence between locations across the width of a glass sheet and locations on the glass ribbon which produced the sheet. Also, once the thickness of a glass ribbon becomes fixed, it does not change and thus can be determined on sheets after they have been separated from the ribbon. Since measurements on sheets are easier to make than measurements on a ribbon, thicknesses are normally determined on a glass sheet, but apply equally to the sheet and the ribbon from which the sheet was separated. Accordingly, as used herein and in the claims, thicknesses, thickness distributions, thickness response functions, and the like refer to both a glass sheet and the ribbon from which the sheet was made.

In broad outline, the method of this disclosure uses an iterative process to control the thickness distribution across a glass ribbon (and hence across glass sheets made from the ribbon) wherein individual thermal elements (e.g., air flows from individual Dockerty tubes) are adjusted at each iteration based on a mathematical analysis of the thickness behavior produced by the prior iteration. The iterations are continued until the thickness uniformity of glass sheets separated from the ribbon is within specifications.

Before performing the iterations, the response of the thickness of the ribbon to a single thermal element (e.g., a single Dockerty tube) is determined experimentally and then a sheet thickness response function is assigned to each of the thermal elements so that the mathematical analysis employed in the iteration process can be performed. Although an experimental determination is preferred, the response of the ribbon's thickness to a single thermal element can also be determined from previous experience or a model, e.g., a model based on engineering calculations.

If, for example, N thermal elements are used to control the sheet thickness distribution, then for each element, the sheet thickness response $\Delta t_i(x)$ can be written:

$$\Delta t_i(x) = \text{func}(x, x0_i, w_i, \dots)$$

where i is the element number (i=1, ..., N), x is a variable indicating location across the width of the ribbon or, equivalently, across the width of the sheet, $x0_i$ is a parameter representing the across-the-ribbon location of the $i^{th}$ thermal element, $w_i$ is a parameter representing the width of the thickness effect of the $i^{th}$ thermal element, and func is a function of the variable x and the parameters $x0_i$, $w_i$ and possibly other parameters, e.g., the $\beta_i$ parameters used in the Mexican Hat and sinus x over x functions discussed below. It should be noted that $\Delta t_i(x)$ represents the change in thickness from the baseline case where all of the thermal elements are turned off. In many cases, the parameters $x0_i$ and $w_i$ will be sufficient to describe the thickness response to individual thermal elements, in which case $\Delta t_i(x)$ can be written:

$$\Delta t_i(x) = \text{func}(x, x0_i, w_i)$$

Based on experimental studies, it has been found that the sheet thickness response function can be a Gaussian function or a Gaussian-like function. In particular, $\Delta t_i(x)$ can be written:

Gaussian: $\Delta t_i(x) = \exp\left(-\left(\frac{x-x0_i}{w_i}\right)^2\right)$

Figure 1:
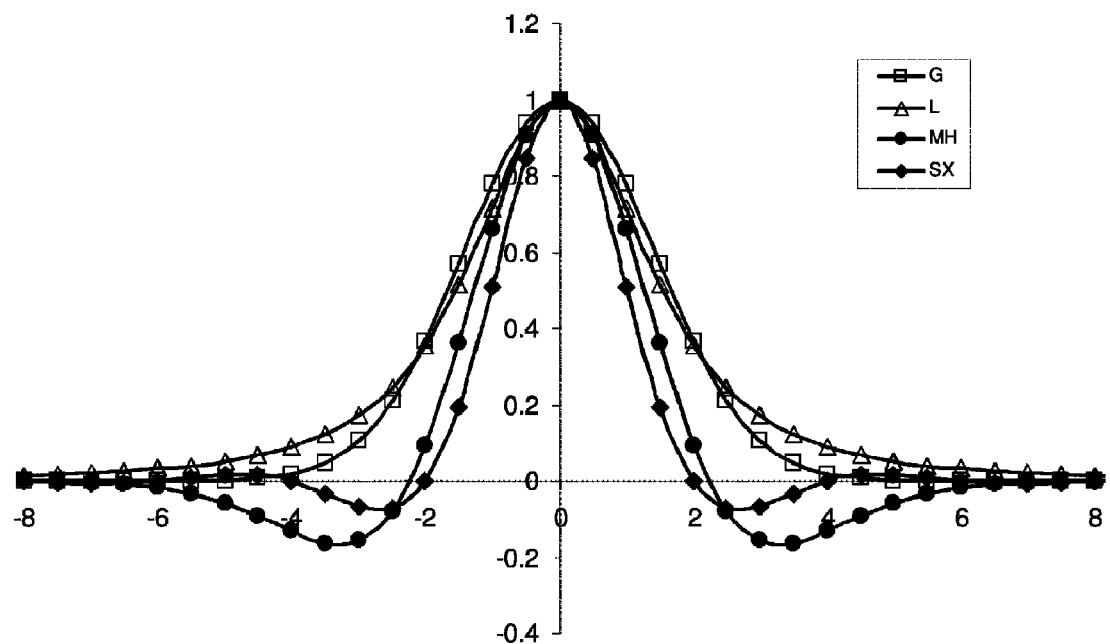
FIG. 1 is a plot of Gaussian and Gaussian-like functions which can be used as sheet thickness response functions.
Figure 2:
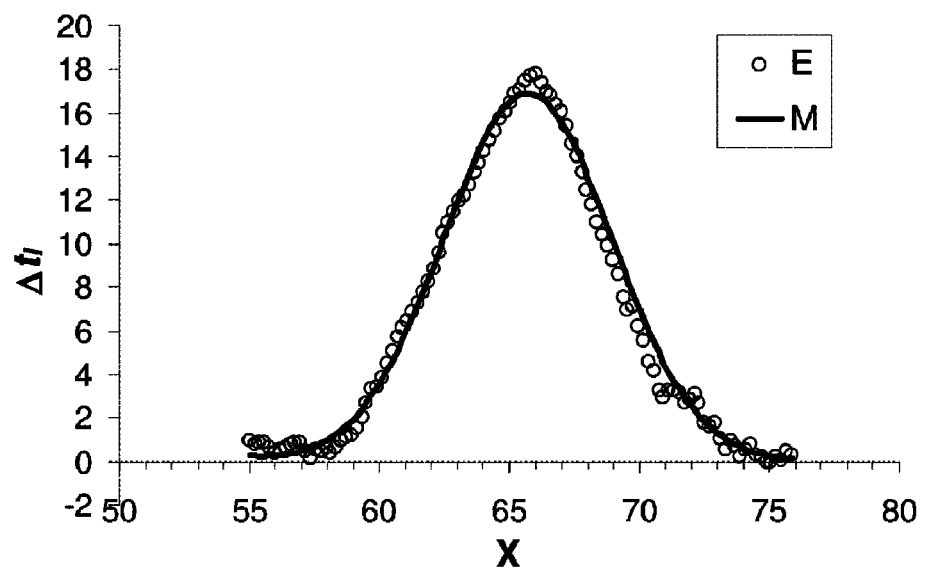
FIG. 2 is a plot illustrating the close fit of a Gaussian sheet thickness response function to the thickness changes produced by an individual thermal element.
Figure 3:
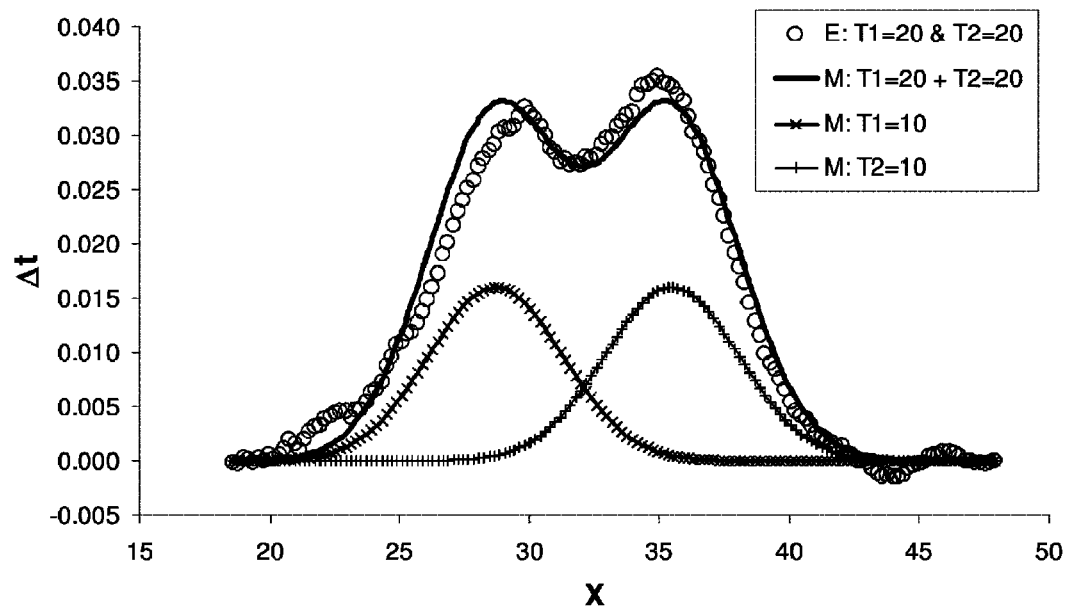
FIG. 3 is a plot illustrating the applicability of linear superposition to the thickness response of two thermal elements.
Figure 6:
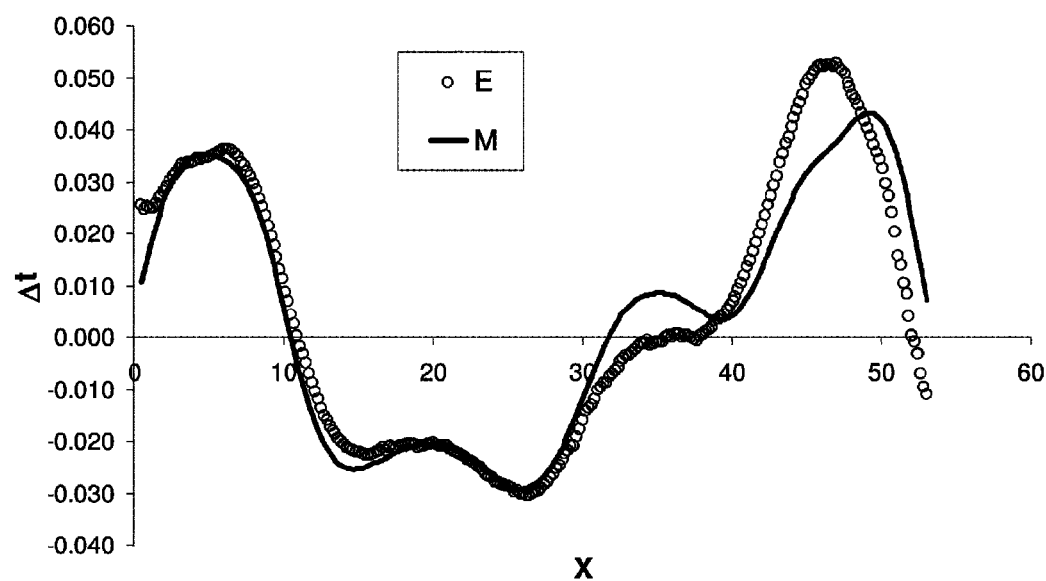
FIG. 6 is a plot illustrating an exemplary comparison after one iteration between a measured thickness distribution (open data points) and a thickness distribution based on $A_i$ values and Gaussian sheet thickness response functions (solid curve). More particularly, the data points and curve show thickness changes ($\Delta t$ values) after one iteration.

Lorentzian: $\Delta t_i(x) = \dfrac{1}{\left(1+\left(\frac{x-x0_i}{w_i}\right)^2\right)}$ Modified Lorentzian: $\Delta t_i(x) = \dfrac{1}{\left(1+\left(\frac{x-x0_i}{w_i}\right)^2\right)^{\frac{3}{2}}}$ Mexican Hat: $\Delta t_i(x) =$
$(1+\beta_i)\left(\exp\left(-\left(\frac{x-x0_i}{w_i}\right)^2\right)-\beta_i\exp\left(-\left(\frac{x-x0_i}{w2_i}\right)^2\right)\right)$ Sinus $x$ over $x$: $\Delta t_i(x) = \begin{cases} 1, & \text{if } |x| < 10^{-6} \\ \dfrac{\sin\left(\frac{2\pi}{w_i}x\right)}{\frac{2\pi}{w_i}x\left(1+\beta_i\left(\frac{2\pi}{w_i}x\right)^2\right)}, & \text{if } |x| \geq 10^{-6} \end{cases}$ FIG. 1 plots these functions for $x0_i=0$ in all cases, $w_i=2$ for all cases except the Mexican Hat where $w_i=3$, and $\beta_i$ equal 1.0 and 0.1 for the Mexican Hat and sinus x over x functions, respectively. The horizontal axis in this plot and in the plots of FIGS. 2, 3, and 6 is in units of the spacing between thermal elements. In FIG. 1, the open square data points represent the Gaussian function; the open triangles, the modified Lorentzian; the filled circles, the Mexican Hat; and the filled diamonds, the sinus x over x. The $\beta_i$ parameter has different meanings in the Mexican Hat and sinus x over x functions and thus will, in general, have different values when fitted to the same experimental data. In particular, in the Mexican Hat, $\beta_i$ controls the depth of the negative part of the function. In $\sin(x)/x$, increasing $\beta_i$ narrows the function's effect and decreases negative-positive oscillations outside the main peak of the function. In numerical analysis the sinus x over x function is treated differently close to x=0 as indicated above. Analytically, such special handling is not necessary. It should be noted that in general, the same function is used for all of the thermal elements, although, if desired, different functions could be used for different elements.

FIG. 2 demonstrates the ability of a Gaussian function to accurately represent the sheet thickness response of a thermal element. In this figure, the vertical axis shows the thickness response in microns and the horizontal axis represents distance in terms of thermal element numbers (Dockerty tube numbers). The open data points represent measured values and the solid curve represents a Gaussian fit to the experimental results. As illustrated by this figure, the thickness response of a glass ribbon (and thus glass sheets produced from the ribbon) to an individual thermal element can be accurately modeled by a Gaussian function. A similar result can be obtained for the Gaussian-like functions, such as those discussed above and illustrated in FIG. 1.

Once a sheet thickness response function has been assigned to each of the thermal elements, an experimental determination is made as to whether the resulting thickness change from all the thermal elements can be represented as a linear superposition of individual thickness responses, i.e., whether the overall thickness response $\Delta t(x)$ can be written:

$$\Delta t(x) = \sum_{i=1}^{N} A_i \Delta t_i(x) \quad (1)$$

where $A_i$ is the amplitude of the thickness response corresponding to the $i^{th}$ thermal element. Note again that $\Delta t(x)$ is the change from the baseline case where all of the thermal elements are turned off.

FIG. 3 shows the results of such an experimental determination. In this figure, the vertical axis shows the thickness response in millimeters and the horizontal axis shows thermal element numbers (Dockerty tube numbers). For this test, two thermal elements (T1 and T2) were used which were operated at amplitudes of 10 and 20 (arbitrary units). To better illustrate linear superposition, the particular thermal elements chosen for FIG. 3 were 6 elements apart, which corresponded to 6 inches for the equipment used. The "x" data points represent modeled results (Gaussian response function) for T1 operated at an amplitude of 10; the "+" data points represent modeled results (Gaussian response function) for T2 operated at an amplitude of 10; the solid line represents the modeled results for the superposition of T1 and T2, each operated at an amplitude of 20; and the open data points represent the experimentally measured thickness changes for T1 and T2, each operated at 20. As can be seen in this figure, the experimental data validates the use of linear superposition in modeling the thickness response to multiple thermal elements acting simultaneously.

Figure 4:
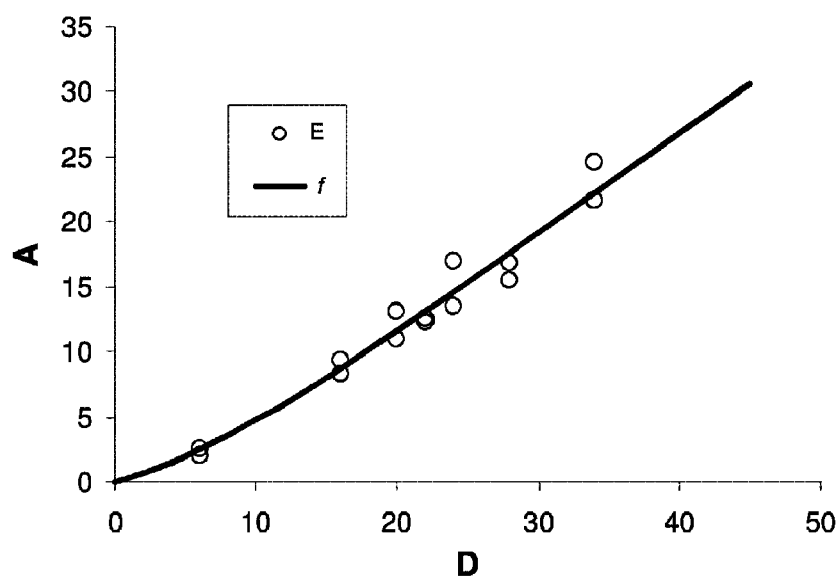
FIG. 4 is a plot illustrating an exemplary relationship between A values and D values.

The next relationship employed in the mathematical procedure is that between the value of the amplitude of the thickness response ($A_i$) and the corresponding thermal element operating variable ($D_i$), i.e., the value which is controllable during operation of the glass making machine, e.g., the magnitude of air flow through a Dockerty flow tube. FIG. 4 shows experimental data (open data points) illustrating the $A_i$ versus $D_i$ behavior, where $A_i$ is plotted along the vertical axis and $D_i$ along the horizontal axis, and both are in arbitrary units.

Figure 5:
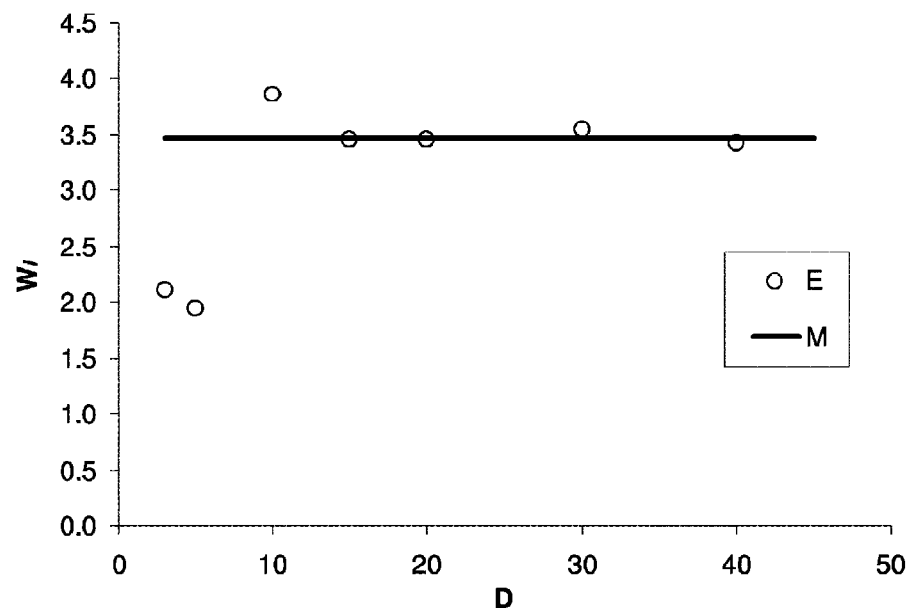
FIG. 5 is a plot illustrating an exemplary relationship between the $w_i$ parameter of a Gaussian sheet thickness response function and D values.

FIG. 5 further shows that the width parameter $w_i$ of a Gaussian sheet thickness response function is substantially independent of the value of $D_i$. In this figure, the vertical axis represents the width parameter obtained by fitting a Gaussian to experimental data (see, for example, FIG. 2) and the horizontal axis represents D values. The open data points are experimental measurements and the solid line is an assumed constant $w_i$ value. As can be seen, except for very low D values, unlikely to be frequently used in practice, the $w_i$ value is substantially independent of the strength (D value) of the thermal element (e.g., Dockerty tube). Similar data to that of FIG. 5 can be obtained for the $w_i$ and other parameters used in Gaussian-like functions, e.g., those discussed above and illustrated in FIG. 1.

Returning to FIG. 4, as can be seen in this figure, the A values are a monotonous function of the D values. Thus, the data can be fit with a function $f$: $A_i = f(D_i)$ for which the inverse function $f^{-1}$ exists: $D_i = f^{-1}(A_i)$. A variety of $f$ functions can be used in the practice of this disclosure. For example, for the data of FIG. 4, the following function has been found to work successfully:

$$A = f(D) = \begin{cases} \beta D^{\alpha}, & \text{if } D < D0 \\ \gamma D + \delta, & \text{if } D \geq D0, \end{cases}$$

where $\gamma$, $\delta$, $D0$ are independent coefficients and $$\alpha = \frac{\gamma D0}{\gamma D0 + \delta}, \quad \beta = \frac{\gamma D0}{\alpha D0^{\alpha}}$$

The inverse function is then:

$$D = f^{-1}(A) = \begin{cases} (A/\beta)^{\frac{1}{\alpha}}, & \text{if } A < \gamma D0 + \delta \\ (A - \delta)/\gamma, & \text{if } A \geq \gamma D0 + \delta \end{cases}$$

The solid curve in FIG. 4 uses this function with the γ, δ, D0 coefficients determined by least squares curve fitting. As can be seen, the function accurately fits the experimental data. As an alternative to using a function to associate $D_i$ values with $A_i$ values, interpolation of a data table can also be used for this purpose.

With the foregoing in hand, the sheet thickness can be controlled by the following iterative procedure.

Step 1: Measure a thickness trace $t_{meas}^k(x)$ on a glass sheet (or on a population of glass sheets and then compute an average trace), where k is the iteration number. At start-up, k equals 1.

Step 2: Determine if the measured thickness distribution satisfies specifications. If so, no further analysis is required. In such a case, a timer will typically be set so that Step 1 is repeated after a specified delay. Examples of the types of specifications that can be used include:

$$\frac{1}{x_e - x_b} \int_{x_b}^{x_e} [t_{meas}^k(x) - t_{target}(x)]^2 dx < \delta, \quad (a)$$

where $t_{target}(x)$ is the desired thickness profile, $x_b$, $x_e$ are quality area margins, i.e., the locations which include, but are typically somewhat wider than, the portion of the ribbon that is commercially acceptable and will ultimately be shipped to customers, and δ is the acceptable thickness distribution tolerance.

$$\max_{x \in [x_b, x_e]} \left( \frac{d}{dx}(t_{meas}^k(x)) \right) < \delta, \quad (b)$$

where δ is the maximum allowed derivative of the thickness profile.

Step 3: If the measured thickness distribution does not satisfy specifications, a set of amplitudes $\{A_i^{k+1}\}_{i=1}^N$, which will improve the thickness profile, is determined. The amplitudes are obtained by minimizing a functional based on the measured thicknesses or their derivatives.

For example, where measured thicknesses are used, an update to the amplitudes can be obtained by minimizing the following functional:

$$\min_{\{A_i^{k+1}\}_{i=1}^N} \int_{x_b}^{x_e} \left( t_{meas}^k(x) - t_{target}(x) + \sum_{i=1}^N (A_i^{k+1} - A_i^k) \Delta t_i(x) \right)^2 dx,$$

where, as above, $t_{target}(x)$ is the desired thickness profile, $x_b$, $x_e$ are the quality area margins, $A_i^k$ are the amplitudes corresponding to the current values of the thermal element variables $A_i^k = f(D_i^k)$, and $A_i^{k+1}$ are the new set of amplitudes. For the first iteration, the $A_i^k$ values can, for example, be all equal to zero if all of the thermal elements are turned off (i.e., if all the $D_i$ values are zero). Alternatively, some or all of the $A_i^k$ values for the first iteration can be non-zero if some or all of the $D_i$ values are non-zero based on, for example, past experience in controlling sheet thickness variations and/or initial production of glass sheets prior to the employment of the methods disclosed herein.

Where derivatives of measured thicknesses are used, an update to the amplitudes can be obtained by minimizing the following functional:

$$\min_{\{A_i^{k+1}\}_{i=1}^N} \left( \max_{x \in [x_b, x_e]} \left( \frac{d}{dx}(t_{meas}^k(x)) + \sum_{i=1}^N (A_i^{k+1} - A_i^k) \frac{d}{dx}(\Delta t_i(x)) \right) \right)$$

where the symbols have the same meaning as above.

In either case, the minimization can be performed using standard numerical techniques, e.g., the minimization can be performed using the standard SOLVER add-in for MICROSOFT'S EXCEL program.

Step 4: Using $f^{-1}$, values for the thermal element operating variables ($D_i^{k+1}$) for the new set of amplitude values ($A_i^{k+1}$) are calculated and applied to the thermal element controllers:

$$D_i^{k+1} = f^{-1}(A_i^{k+1})$$

In a typical application, a timer will then be set so that Step 1 is repeated after a specified delay, e.g., after the overall process has stabilized at the new set of $D_i$ values.

In practice, the above procedure has been found to successfully cancel out any measured thickness variations in glass sheets in only a few iterations, e.g., 2-4 iterations. Although all thickness variations may not be canceled perfectly, the resulting glass sheets are well within specifications. For example, using two iterations, the variation in thickness across a glass ribbon was reduced to 8.6 microns, and with one additional iteration, it was reduced to 5.9 microns, well within commercial specifications. The procedure was tested on different glass making machines employing the fusion downdraw process and found to work successfully in all cases and, in particular, was found to work successfully under start-up conditions.

FIG. 6 shows representative data of the ability of the foregoing approach to model and thus control the thickness variations of glass ribbons. The vertical axis in this figure shows Δt(x) values in millimeters after one iteration and, as indicated above, the horizontal axis is in terms of thermal element number (Dockerty tube number). The solid line shows the model results and the open circles show the measured thickness values. The fit is quite close, thus allowing the minimization procedure to effectively move the measured data towards the desired target by selecting a new set of $A_i$ values for the next iteration.

From the foregoing, it can be seen that the advantages of the methods of this disclosure include: (a) The procedure for calculating values for the operating variables of thermal elements brings thickness control from the realm of skilled craft to the realm of rigorous procedure. Therefore, using the procedure makes thickness control consistent from glass-making-machine to glass-making-machine, and from plant to plant. (b) Using this procedure reduces the amount of time required for bringing thickness variations within limits. (c) The procedure gives a rigorous way to assess if a given feature in the thickness trace can be controlled by using a particular thermal control system (e.g., a Dockerty system), and if so, how. (d) The procedure can be used to achieve tighter thickness control than possible using the current "feel" approach. (e) The calculation procedure can be used in model-based automatic control of sheet thickness, e.g., as part of overall automation of the sheet manufacturing process.

A variety of modifications that do not depart from the scope and spirit of the invention will be evident to persons of ordinary skill in the art from the foregoing disclosure. For example, although normally $t_{target}(x)$ will be selected to produce glass sheets having a substantially uniform thickness, it can also be selected to produce glass sheets whose thickness varies in a prescribed manner across the width of the sheet. As just one example, the thickness can increase from one edge of the sheet to the other. The following claims are intended to cover these and other modifications, variations, and equivalents of the specific embodiments set forth herein.

What is claimed is:

1. A method for producing glass sheets comprising:
   (I) producing a glass ribbon having a width;
   (II) using a plurality of thermal elements to control the temperature of the ribbon across its width at a location along the length of the ribbon that is prior to the location where the thickness of the ribbon becomes fixed, said thermal elements being distributed across the width of the ribbon and each element having an independently adjustable operating variable $D_i$; and
   (III) separating glass sheets from the ribbon;
   wherein step (II) comprises selecting a set of values for the operating variables $D_i$ of the thermal elements by:
   (a) assigning a sheet thickness response function $\Delta t_i(x)$ to each of the thermal elements of the form:

$$\Delta t_i(x) = \text{func}(x, x0_i, w_i, \ldots),$$

where x is a location on the sheet, $x0_i$ is a location-of-the-thermal-element parameter, $w_i$ is a width-of-effect parameter, and func is a function of at least the variable x and the parameters $x0_i$ and $w_i$;
   (b) selecting values for the $x0_i$ and $w_i$ parameters;
   (c) selecting a set of $D_i$ values for the thermal elements, said set of $D_i$ values being mathematically associated with a set of amplitude values $A_i$;
   (d) applying the set of $D_i$ values to the thermal elements and producing at least one glass sheet;
   (e) measuring a thickness distribution of at least one glass sheet produced in step (d);
   (f) determining a revised set of $A_i$ values by minimizing a functional of (i) the measured thickness distribution, (ii) the set of $A_i$ values, and (iii) a target thickness distribution, said functional including a linear superposition of the sheet thickness response functions for the thermal elements;
   (g) applying a set of $D_i$ values mathematically associated with the set of $A_i$ values determined in step (f) to the thermal elements and producing at least one glass sheet;
   (h) measuring a thickness distribution of the at least one glass sheet produced in step (g); and
   (i) comparing the thickness distribution measured in step (h) with a thickness variation criterion and, if the criterion is not satisfied, repeating steps (f) through (h), one or more times, until the criterion is satisfied, where for each repetition, the measured thickness distribution and the set of $A_i$ values used in the functional which is minimized in step (f) are those determined in the prior repetition;
   wherein:
   (A) the thickness variation criterion used in step (i) is selected from the group consisting of:
     (i) a uniform thickness within a predetermined tolerance defined by a commercial specification; and
     (ii) a predetermined non-uniform thickness within a predetermined tolerance defined by a commercial specification; and
   (B) the functional used in step (f) is of the form:

$$\min_{\{A_i^{k+1}\}_{i=1}^{N}} \int_{x_b}^{x_e} \left( t_{meas}^k(x) - t_{target}(x) + \sum_{i=1}^{N} (A_i^{k+1} - A_i^k) \Delta t_i(x) \right)^2 dx,$$

where $t^k_{meas}(x)$ is the measured thickness distribution, $t_{target}(x)$ is a desired thickness distribution, $x_b$, $x_e$ are margins which include the usable width of the ribbon, the $A_i^k$ are the current $A_i$ values, the $A_i^{k+1}$ are the new $A_i$ values, and N is the number of thermal elements.

2. The method of claim 1 wherein in step (i), the comparison of the thickness distribution measured in step (h) with the thickness variation criterion comprises determining a least squares difference between the measured thickness distribution and a target thickness distribution.

3. The method of claim 1 wherein in step (i), the comparison of the thickness distribution measured in step (h) with the thickness variation criterion comprises determining a maximum slope of the measured thickness distribution.

4. The method of claim 1 wherein the sheet thickness response function is a Gaussian function.

5. The method of claim 1 wherein the sheet thickness response function is a Gaussian-like function.

6. The method of claim 5 wherein the Gaussian-like function is selected from the group consisting of Lorentzian, modified Lorentzian, Mexican hat, and sinus x over x functions.

7. The method of claim 1 wherein the $D_i$ values are mathematically associated with the $A_i$ values by a function of the form:

$$A = f(D) = \begin{cases} \beta D^\alpha, & \text{if } D < D0 \\ \gamma D + \delta, & \text{if } D \geq D0, \end{cases}$$

where $\gamma$, $\delta$, $D0$ are independent coefficients and $$\alpha = \frac{\gamma D0}{\gamma D0 + \delta}, \quad \beta = \frac{\gamma D0}{\alpha D0^\alpha}.$$

8. The method of claim 1 wherein the number of repetitions of steps (f) through (h) required to satisfy the thickness variation criterion of step (i) is between two and four.

9. A method for producing glass sheets comprising:
   (I) producing a glass ribbon having a width;
   (II) using a plurality of thermal elements to control the temperature of the ribbon across its width at a location along the length of the ribbon that is prior to the location where the thickness of the ribbon becomes fixed, said thermal elements being distributed across the width of the ribbon and each element having an independently adjustable operating variable $D_i$; and
   (III) separating glass sheets from the ribbon;
   wherein step (II) comprises selecting a set of values for the operating variables $D_i$ of the thermal elements by:
   (a) assigning a sheet thickness response function $\Delta t_i(x)$ to each of the thermal elements of the form:

$$\Delta t_i(x) = \text{func}(x, x0_i, w_i, \ldots),$$

where x is a location on the sheet, $x0_i$ is a location-of-the-thermal-element parameter, $w_i$ is a width-of-effect parameter, and func is a function of at least the variable x and the parameters $x0_i$ and $w_i$;
   (b) selecting values for the $x0_i$ and $w_i$ parameters;
   (c) selecting a set of $D_i$ values for the thermal elements, said set of $D_i$ values being mathematically associated with a set of amplitude values $A_i$;
   (d) applying the set of $D_i$ values to the thermal elements and producing at least one glass sheet;
   (e) measuring a thickness distribution of at least one glass sheet produced in step (d);
   (f) determining a revised set of $A_i$ values by minimizing a functional of (i) a derivative of the measured thickness distribution and (ii) the set of $A_i$ values, said functional including a linear superposition of derivatives of the sheet thickness response functions for the thermal elements;

(g) applying a set of $D_i$ values mathematically associated with the set of $A_i$ values determined in step (f) to the thermal elements and producing at least one glass sheet;

(h) measuring a thickness distribution of the at least one glass sheet produced in step (g); and (i) comparing the thickness distribution measured in step (h) with a thickness variation criterion and, if the criterion is not satisfied, repeating steps (f) through (h), one or more times, until the criterion is satisfied, where for each repetition, the measured thickness distribution and the set of $A_i$ values used in the functional which is minimized in step (f) are those determined in the prior repetition;

wherein:

(A) the thickness variation criterion used in step (i) is selected from the group consisting of:
   a uniform thickness within a predetermined tolerance defined by a commercial specification; and
   (ii) a predetermined non-uniform thickness within a predetermined tolerance defined by a commercial specification; and (B) the functional used in step (f) is of the form:

$$\min_{\{A_i^{k+1}\}_{i=1}^N} \left( \max_{x \in [x_b, x_e]} \left( \frac{d}{dx}(t_{meas}^k(x)) + \sum_{i=1}^N (A_i^{k+1} - A_i^k) \frac{d}{dx}(\Delta t_i(x)) \right) \right)$$

where $t_{meas}^k(x)$ is the measured thickness distribution, $x_b$, $x_e$ are margins which include the usable width of the ribbon, the $A_i^k$ are the current $A_i$ values, the $A_i^{k+1}$ are the new $A_i$ values, and N is the number of thermal elements.

10. The method of claim 9 wherein in step (i), the comparison of the thickness distribution measured in step (h) with the thickness variation criterion comprises determining a least squares difference between the measured thickness distribution and a target thickness distribution.

11. The method of claim 9 wherein in step (i), the comparison of the thickness distribution measured in step (h) with the thickness variation criterion comprises determining a maximum slope of the measured thickness distribution.

12. The method of claim 9 wherein the sheet thickness response function is a Gaussian function.

13. The method of claim 9 wherein the sheet thickness response function is a Gaussian-like function.

14. The method of claim 13 wherein the Gaussian-like function is selected from the group consisting of Lorentzian, modified Lorentzian, Mexican hat, and sinus x over x functions.

15. The method of claim 9 wherein the $D_i$ values are mathematically associated with the $A_i$ values by a function of the form:

$$A = f(D) = \begin{cases} \beta D^\alpha, & \text{if } D < D0 \\ \gamma D + \delta, & \text{if } D \geq D0, \end{cases}$$

where $\gamma$, $\delta$, $D0$ are independent coefficients and $$\alpha = \frac{\gamma D0}{\gamma D0 + \delta}, \quad \beta = \frac{\gamma D0}{\alpha D0^\alpha}.$$

16. The method of claim 9 wherein the number of repetitions of steps (f) through (h) required to satisfy the thickness variation criterion of step (i) is between two and four.

* * * * *